United States Patent [19]

Wagstaff et al.

[11] Patent Number: 4,612,855
[45] Date of Patent: Sep. 23, 1986

[54] TWINE WRAPPING APPARATUS WITH STATIONARY TWINE GUIDE MEMBER

[75] Inventors: Robert A. Wagstaff, Lancaster; Emmett F. Glass, Akron, both of Pa.

[73] Assignee: New Holland Inc., New Holland, Pa.

[21] Appl. No.: 787,955

[22] Filed: Oct. 16, 1985

[51] Int. Cl.[4] ............................................. B65B 13/18
[52] U.S. Cl. ......................................... 100/5; 100/88
[58] Field of Search ................. 100/5, 13, 89; 56/341, 56/342, 343

[56] References Cited

U.S. PATENT DOCUMENTS

| 4,094,239 | 6/1978 | Murr | 100/5 |
|---|---|---|---|
| 4,119,026 | 10/1978 | Sacht | 100/89 |
| 4,133,258 | 1/1979 | Popiolek et al. | 100/5 |
| 4,306,494 | 12/1981 | Nishibe et al. | 100/5 |
| 4,378,732 | 4/1983 | Simonis et al. | 100/5 |
| 4,502,646 | 3/1985 | Meiers | 242/149 |
| 4,517,890 | 5/1985 | Campbell et al. | 100/5 |

FOREIGN PATENT DOCUMENTS

| 0046427 | 2/1984 | European Pat. Off. . |
| 2518363 | 12/1981 | France . |

*Primary Examiner*—Billy J. Wilhite
*Attorney, Agent, or Firm*—Darrell F. Marquette; Frank A. Seemar; Larry W. Miller

[57] ABSTRACT

Apparatus (52) is provided for wrapping bales with twine in a type of round baler (1) having bale forming mechanism comprised of a plurality of conveying members such as rollers (36a–36f). The twine wrapping apparatus (52) includes a twine dispensing member (56) mounted for pivoting movement to dispense twine through a gap (35) between two of the conveying members (36d and 36e). A stationary member (88) guides the twine into the gap (35) during the pivoting movement of the twine dispensing member (56).

9 Claims, 12 Drawing Figures

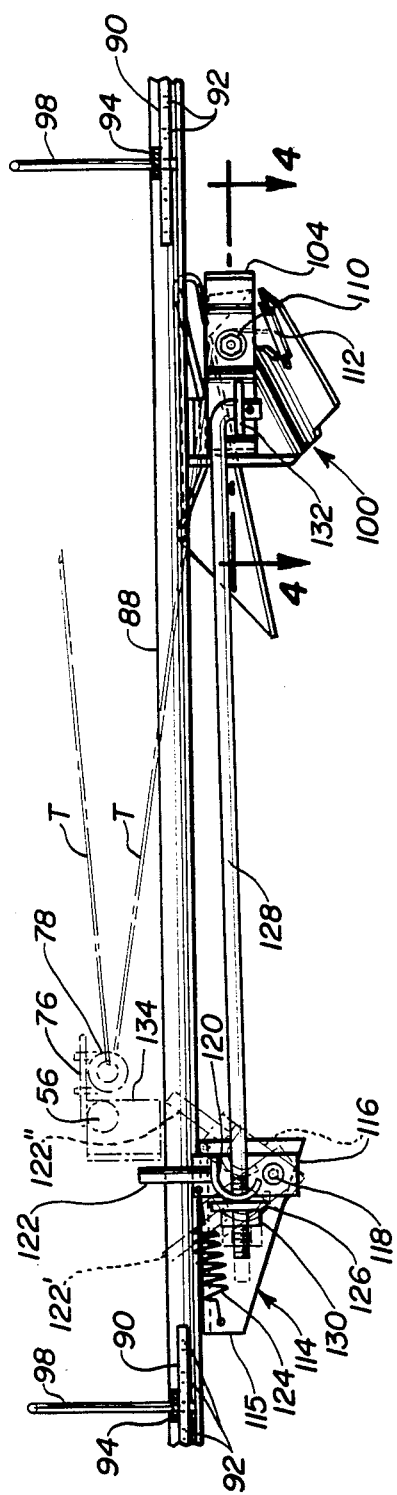
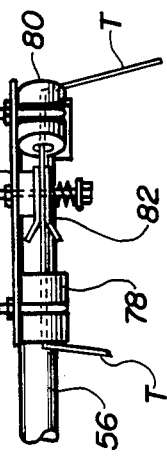
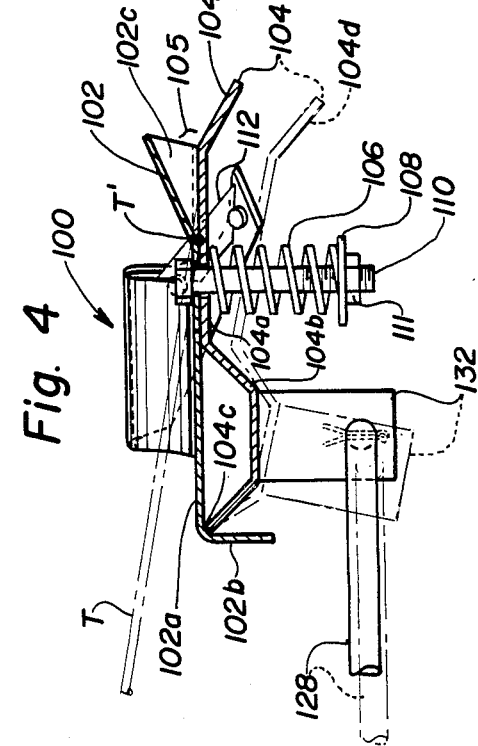

TWINE WRAPPING APPARATUS WITH STATIONARY TWINE GUIDE MEMBER

BACKGROUND AND SUMMARY OF THE INVENTION

This invention relates generally to roll baling machines typically referred to as round balers which form cylindrical roll bales of crop material and, in particular, to a twine wrapping apparatus for such roll baling machines.

In the type of round baler disclosed in U.S. Pat. No. 4,119,026 where a series of conveyor belts or rollers constitute the bale forming mechanism, it has been found desirable to mount apparatus for wrapping bales with twine in a position to feed twine through a gap between two of the adjacent conveyor belts or rollers. Such a twine wrapping apparatus is disclosed in U.S. Pat. No. 4,133,258 and includes a twine dispensing member which is movable in a linear path parallel to the axis of the bale being wrapped. Various devices are disclosed in U.S. Pat. No. 4,133,258 for moving the twine dispensing member in this linear path. These devices include a reversible screw spindle, a gear rack and pinion combination, and a double chain and sprocket arrangement. A common drawback of all these devices is that they are too costly.

Therefore, it is an object of the present invention to provide a twine wrapping apparatus for the general type of round baler disclosed in U.S. Pat. No. 4,119,026 which is more economical than the apparatus of U.S. Pat. No. 4,133,258.

The twine wrapping apparatus of the present invention is intended for use on a roll baling machine having a frame and a plurality of conveying members extending transversely of the frame for forming crop material into roll bales. The twine wrapping apparatus includes a twine dispensing member mounted for pivoting movement to dispense twine through a gap between two of the conveying members, and stationary guide means extending transversely of the frame for guiding the twine into the gap during pivoting movement of the twine dispensing member.

DESCRIPTION OF THE DRAWINGS

FIG. 3 is a view taken in the direction of arrows 3—3 in FIG. 2 with the parts reversed from the manner shown in FIG. 2;

FIG. 4 is an enlarged view taken in the direction of arrows 4—4 in FIG. 3 with the parts reversed from the manner shown in FIG. 2;

FIG. 12 is a further enlarged sectional view taken along lines 12—12 in FIG. 2.

DESCRIPTION OF THE INVENTION

Figure 1:
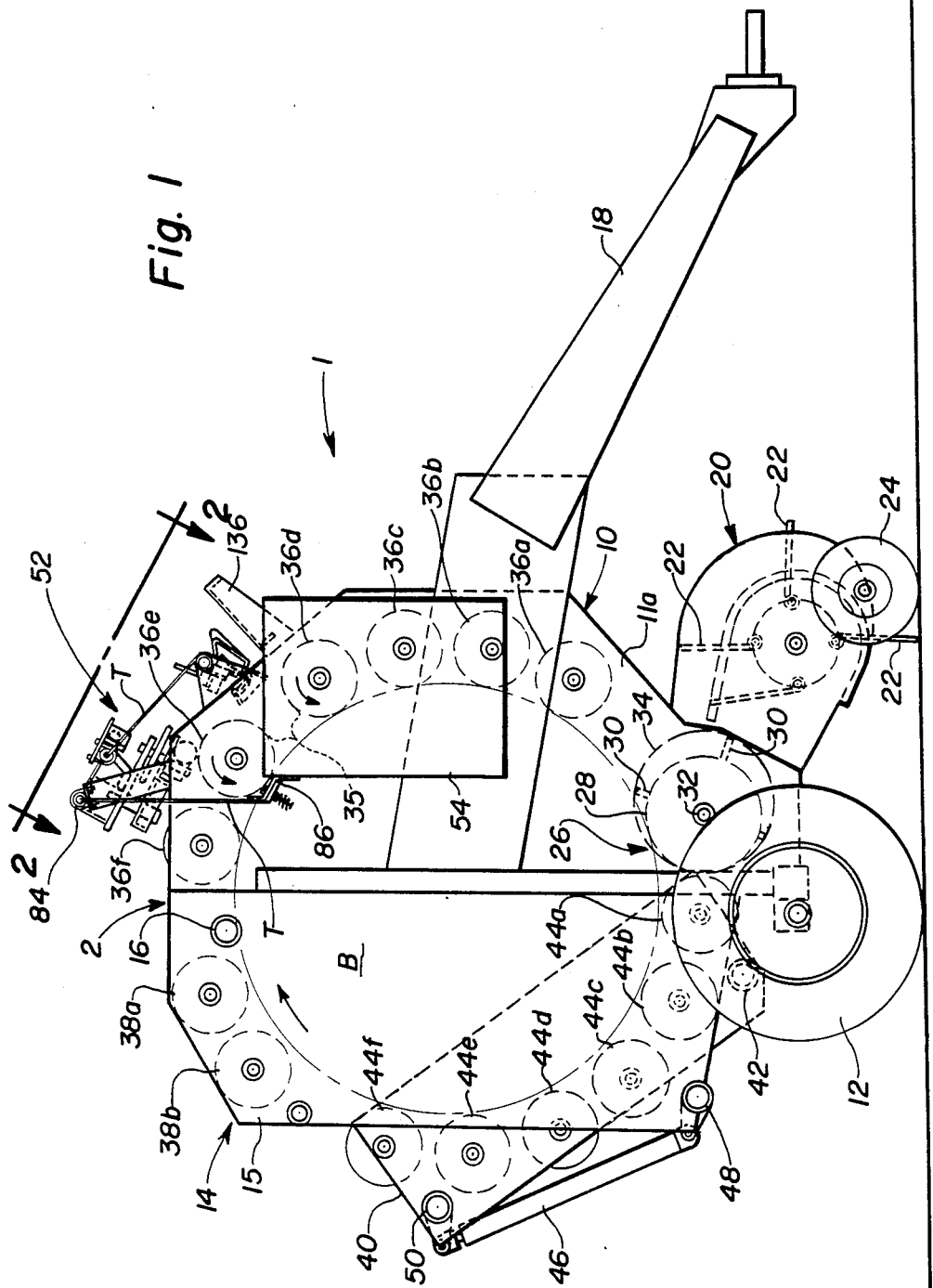
FIG. 1 is a side elevation view of a round baler incorporating the twine wrapping apparatus of the present invention.

Referring to FIG. 1, a round baler 1 includes a frame 2 consisting of a base frame portion 10 supported by a pair of wheels 12 and an auxiliary frame portion or tailgate 14 pivotally connected to the base frame portion 10 by stub shafts 16 mounted in suitable bearings. A tongue 18 is provided on the forward end of the base frame portion 10 for connection to a towing vehicle such as a tractor (not shown). A pickup 20 is attached to the base frame portion 10 and includes a series of fingers 22 movable in a path to lift crop material from the ground. The pickup 20 is supported by a wheel 24. A feeder drum 26 is rotatably mounted on the base frame portion 10 and includes a cylinder 28 and a plurality of fingers 30 mounted on a shaft (not shown) that is offset relative to the shaft 32 on which the cylinder 28 is mounted. As the cylinder 28 is rotated on the shaft 32, the fingers 30 reciprocate through openings in the cylinder 28 so that the tips of the fingers 30 follow a path designated 34.

Figure 2:
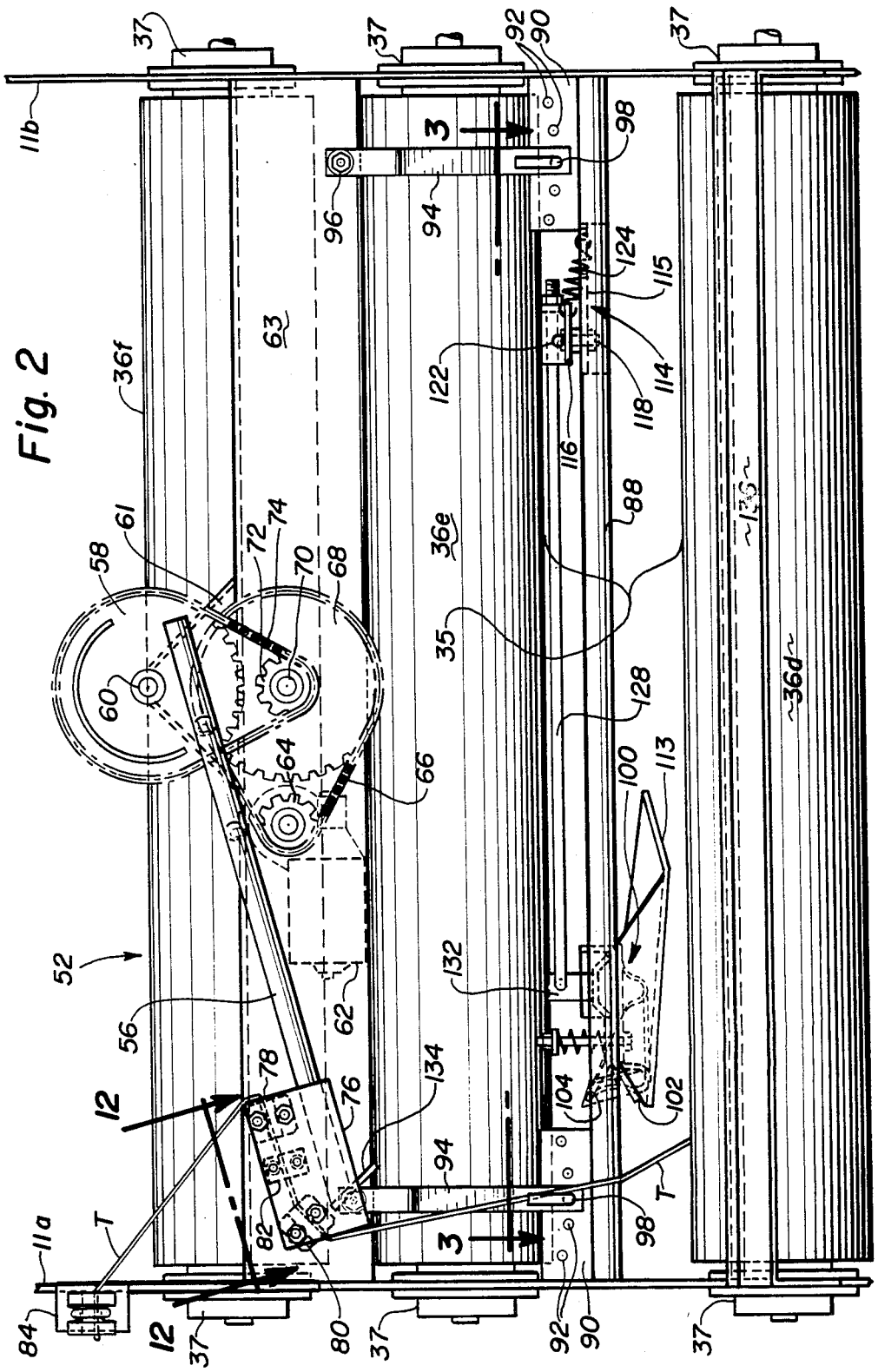
FIG. 2 is an enlarged view of the twine wrapping apparatus of the present invention taken along lines 2—2 in FIG. 1.
Figure 5:
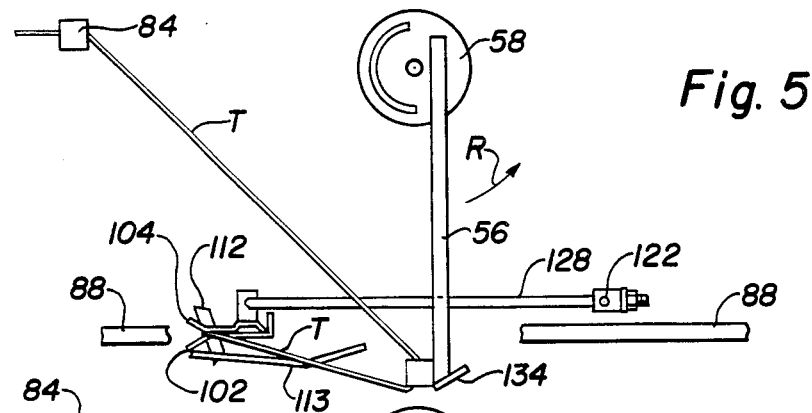
FIG. 5-11 are schematic views taken from FIG. 2 at different stages during the operation of the twine wrapping apparatus of the present invention.
Figure 6:
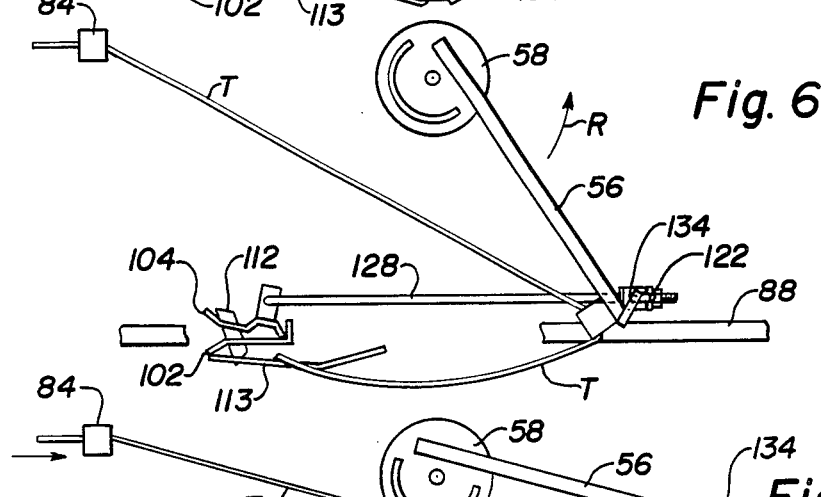

The round baler 1 includes a set of conveying members or rollers 36a through 36f fixedly journalled in bearings 37 shown in FIG. 2 mounted in the sidewalls 11a,11b of the base frame portion 10. Another set of conveying members or rollers 38a and 38b is fixedly journalled in similar bearings mounted in sidewalls 15 of the tailgate 14. A pair of arms 40 are pivoted at one end on stub shafts 42 mounted in the tailgate 14. A further set of conveying members or rollers 44a through 44f is rotatably carried by the arms 40. A hydraulic cylinder 46 is pivoted at its lower end to a beam 48 extending between the sidewalls 15 of the tailgate 14 and at its upper end to a beam 50 connected between the arms 40. The sets of rollers 36a-36f, 38a-38b and 44a-44f extend transversely of the frame 2 and constitute mechanism for forming crop material into roll bales. Although it is not essential to the present invention, the bale forming operation of the round baler 1 will be understood from commonly assigned U.S. Pat. No. 4,566,379 incorporated herein by reference.

A twine wrapping apparatus 52, according to the present invention, is carried on the base frame portion 10 near the top thereof and a supply box 54 containing twine is mounted on the sidewall 11a of the base frame portion 10. As seen in FIG. 2, the twine wrapping apparatus 52 includes a twine dispensing member such as arm 56 fixed to a large diameter sprocket 58 which is rotatably mounted on a shaft 60 carried by a plate 61 on the base frame portion 10. An electric motor 62 is provided on a cross beam 63 of the base frame portion 10 to drive a small diameter sprocket 64 which is connected by a chain 66 to another large diameter sprocket 68 fixed on another shaft 70. Another small diameter sprocket 72 is also fixed on the shaft 70 and is connected to large diameter sprocket 58 by another chain 74. The electric motor 62 is connected by a switch (not shown) to a suitable power source (also not shown) for effecting pivoting movement of the arm 56 via the small diameter sprockets 64 and 72, the large diameter sprockets 58 and 68, and the chains 66 and 74. It should be noted that the large diameter sprockets 58,68 serve to reduce the output speed of the electric motor 62 to a desired level.

A rectangular plate 76 attached to the arm 56 supports a pair of spaced guides 78,80 and a clamp 82 located between the guides 78,80. See FIGS. 2 and 12. Another guide 84 and another clamp 86 are mounted on the sidewall 11a of the base frame portion 10. Twine T extends upwardly from the supply box 54 through the clamp 86 and the guide 84, and then through the guide 78, the clamp 82 and guide 80. The clamps 82,86 are adjustable and cause the twine T to be sufficiently tensioned to prevent tangling thereof. Additionally, the clamp 82 prevents the twine T from being pulled back through the guides 78,80 during pivoting movement of the arm 56.

A stationary twine guide member such as bar 88 extends between and is connected to the sidewalls 11a,11b of the base frame portion 10. The bar 88 extends transversely of the frame 2 and is arranged with its longitudinal axis parallel to the longitudinal axes of the rollers 36a–36f, 38a–38b and 44a–44f. The bar 88 supports plates 90 adjacent its ends which have holes 92 formed therein. Brackets 94 are attached to the cross beam 63 by bolts 96 and carry pins 98 which are extendable through selected holes 92 in the plates 90. The pins 98 prevent the twine T from being wrapped too near the ends of a bale and also prevent the twine T from getting caught between the ends of the rollers 36d, 36e and the sidewalls 11a,11b of the base frame portion 10. The pins 98 are selectably positionable in any of the holes 92 in the associated plates 90 by lifting the pins 98 to deflect the brackets 94, and then rotating the brackets 94 about the bolts 96 to another position to reseat the pins 98 in the selected holes 92.

A clamp assembly 100 is mounted on the bar 88 and includes a jaw member 102 which is stationary and a jaw member 104 which is movable. The jaw member 104 is biased toward the jaw member 102 by a spring 106 which is held in compression between the jaw member 104 and a washer 108 provided on a bolt 110 as seen in FIG. 4. A nut 111 is threaded onto the bolt 110 and is adjustable therealong to vary the compression of spring 106. The jaw member 102 includes an intermediate portion 102a, an end portion 102b disposed substantially perpendicular to the intermediate portion 102a, and another end portion 102c disposed at an obtuse angle to the intermediate portion 102a. The jaw member 104 includes an intermediate portion 104a which normally contacts the intermediate portion 102a of the jaw member 102, an end portion 104b having an edge 104c that contacts the jaw member 102 at the juncture between the intermediate portion 102a and the end portion 102b, and another end portion 104d which is disposed at an obtuse angle to the intermediate portion 104a. The end portions 102c and 104d of the jaw members 102,104 form a mouth 105 therebetween for receiving the twine T which is clamped as shown at T' in FIG. 4 between the intermediate portions 102a,104a of the jaw members 102,104. A knife 112 is mounted on the clamp assembly 100 below the mouth 105 in a fixed position to sever the twine T as it is being clamped. A guard plate 113 covers the clamp assembly 100 on the side thereof adjacent the roller 36d as shown in FIG. 2.

A trip mechanism 114 is also mounted on the bar 88 and includes a lever 116 pivoted to a bracket 115 by a bolt 118. Fixed to the lever 116 is a C-shaped flange member 120 carrying a pin 122. A spring 124 is connected between the lever 116 and the bracket 115 to urge the lever 116 and pin 122 into the trip position shown in solid lines in FIG. 3. In this trip position, the flange member 120 abuts a washer 126 provided on a control rod 128 which extends through the flange member 120. One end of the control rod 128 is threaded and includes a nut 130 for adjusting the location of the washer 126. The other end of the control rod 128 is connected to a bracket 132 which is attached to the end portion 104b of the jaw member 104 of the clamp assembly 100.

A cam plate 134 is mounted on one end of the arm 56 for engagement with the pin 122 of the trip mechanism 114 during pivoting movement of the arm 56. When the arm 56 is moving from the position shown in FIG. 2 in a direction toward the sidewall 11b of the base frame portion 10, the cam plate 134 will strike the pin 122 and move the pin 122 into the actuating position indicated in phantom at 122' in FIG. 3. This causes the control rod 128 to be pulled toward the sidewall 11a of the base frame portion 10 (toward the left as viewed in FIGS. 3 and 4), thereby shifting the jaw member 104 of the clamp assembly 100 to its open position shown in phantom in FIG. 4 to release the twine T. As the arm 56 continues to move toward the sidewall 11b of the base frame portion 10, the spring 106 returns the jaw member 104 of the clamp assembly 100 to its closed position shown in solid lines in FIG. 4 and the pin 122 is returned to its trip position shown in solid lines in FIG. 3. Subsequently when the arm 56 is moving in a direction toward the sidewall 11a of the base frame portion 10, the cam plate 134 will again strike the pin 122 and move it into the non-actuating position indicated in phantom at 122" in FIG. 3. This, however, causes no movement of the control rod 128 since the flange member 120 is moved out of engagement with the washer 126. The jaw member 104 of the clamp assembly 100 remains in its closed position and the spring 124 returns the pin 122 to its trip position as the arm 56 continues to move toward the sidewall 11a of the base frame portion 10.

The operation of the twine wrapping apparatus 52 will now be described with particular reference to FIGS. 5–11. During the formation of a bale in the round baler 1, the arm 56 will remain in the rest position shown in FIG. 5 and the twine T will be clamped between the jaw members 102,104 of the clamp assembly 100. When a bale B as seen in FIG. 1 is ready to be wrapped with twine, the switch (not shown) connecting the power source (also not shown) and the electric motor 62 is closed thereby activating the electric motor 62 and causing pivoting movement of the arm 56 in the direction indicated by the arrow R in FIG. 5. As the twine arm 56 approaches the position shown in FIG. 6, the cam plate 134 engages and moves the pin 122 into its actuating position (122' in FIG. 3) which causes the jaw member 104 of the clamp assembly 100 to be shifted to its open position via the control rod 128. The twine T is released from the clamp assembly 100 and falls through a gap 35 between the rollers 36d and 36e. A shield and guide plate 136, seen in FIGS. 1 and 2, extends transversely of and is mounted on the base frame 10 to insure that the twine T falls through the gap 35. The twine T is guided into the gap 35 by the bar 88 where it is caught between the roller 36d and the bale B which are rotating in opposite directions as indicated in FIG. 1.

Figure 7:
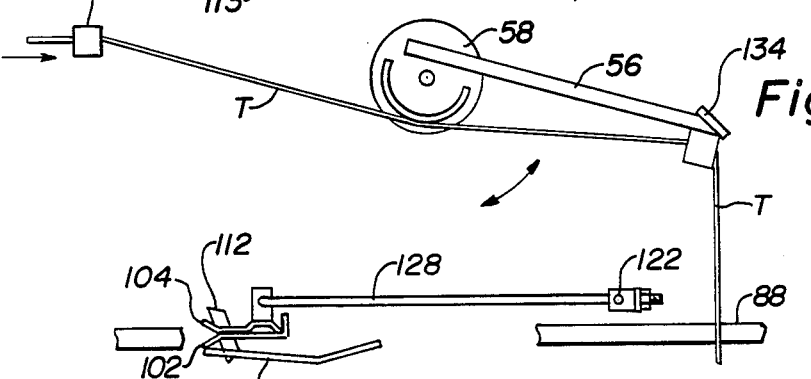
Figure 8:
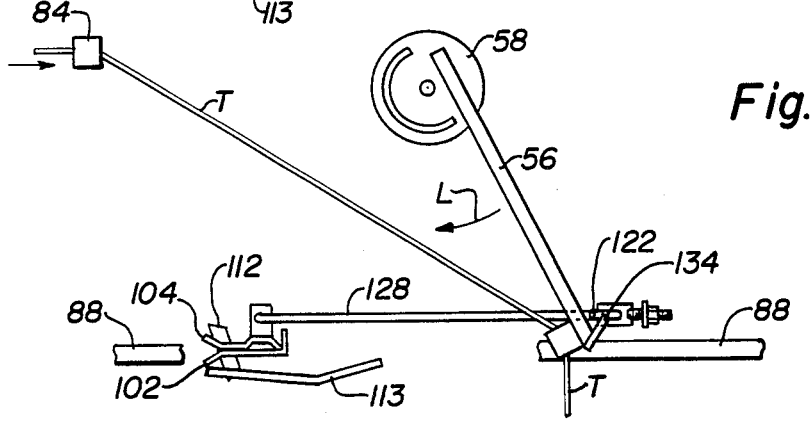

While the arm 56 moves toward the position shown in FIG. 7, twine T is dispensed from the supply box 54, fed through the gap 35 and wrapped around the bale B in a spiral pattern. The bar 88 guides the twine T into the gap 35 to provide proper spacing of the twine T on the bale B. When the arm 56 reaches the position of FIG. 7, its direction of movement is reversed and it starts moving in the direction indicated by the arrow L in FIG. 8. As the arm 56 approaches the position shown in FIG. 8, the cam plate 134 engages and moves the pin 122 into its nonactuating position (122" in FIG. 3) which causes no movement of the control rod 128 or jaw member 104 of the clamp assembly 100. The arm 56 continues to dispense twine T from the supply box 54 through the gap 35 where it is wrapped around the bale B. The twine T continues to be guided into the gap 35 by bar 88 to insure proper spacing of the twine T on the bale B.

Figure 9:
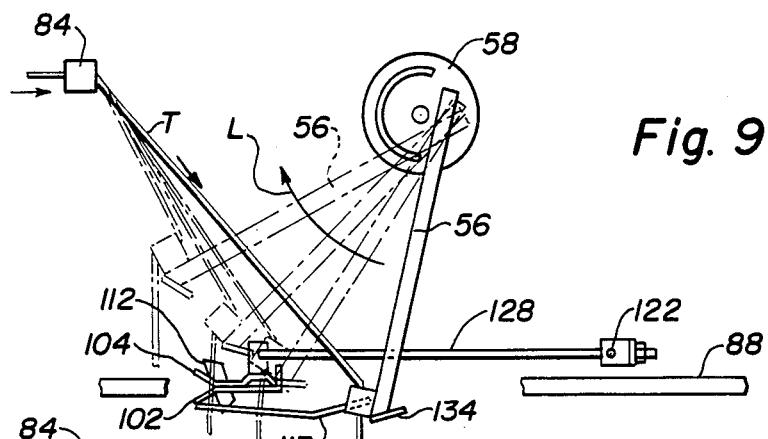
Figure 10:
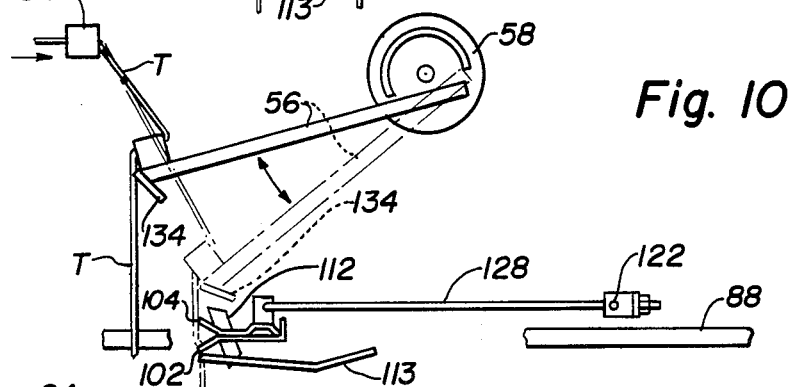
Figure 11:
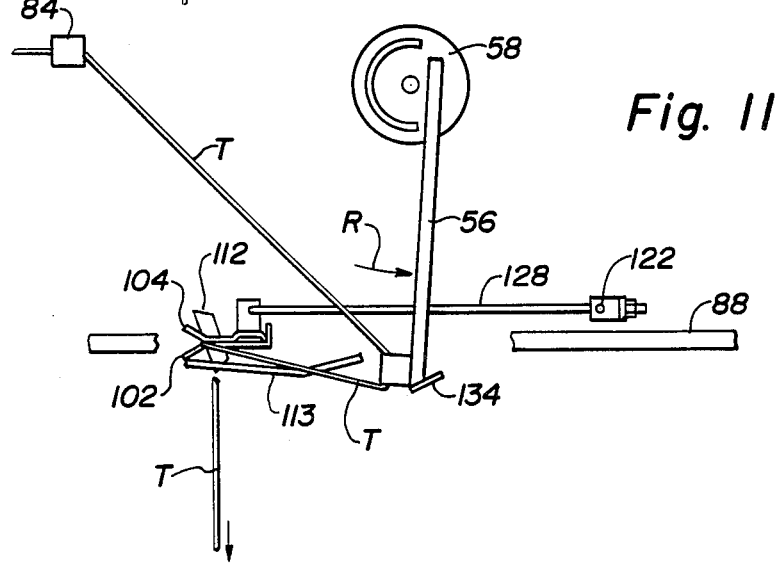

Referring to FIG. 9, the arm 56 keeps moving in the direction indicated by the arrow L. As the arm 56 moves past the clamp assembly 100, the twine T rides on the guard plate 113 to prevent it from getting tangled up in the clamp assembly 100. When the arm 56 reaches the position of FIG. 10, its direction of movement is reversed again and it starts moving in the direction indicated by arrow R in FIG. 11. As the arm 56 approaches the position shown in phantom in FIG. 10, the twine T is received in the mouth 105 formed between the jaw members 102,104 of the clamp assembly 100. The arm 56 continues to move in the direction indicated by arrow R in FIG. 11 thereby pulling the twine T into the clamp assembly 100 where it is firmly clamped between the jaw members 102,104 and simultaneously cut off by the knife 112. The arm 56 continues moving until it returns to the rest position of FIG. 5 whereupon it is stopped by opening the switch (not shown) to deactivate the electric motor 62. The arm 56 remains in this position until another bale is ready to be wrapped.

It will be understood that the twine wrapping apparatus of the present invention may also be used on a round baler where conveyor belts instead of rollers constitute the conveying members of the bale forming mechanism. Such a round baler is disclosed in U.S. Pat. No. 4,119,026. The electric motor 62 may be replaced by a hydraulic motor, and automatic controls may be used to operate the electric motor 62 or the hydraulic motor.

Having thus described the invention, what is claimed is:

1. In a roll baling machine having a frame, a plurality of conveying members extending transversely of said frame for forming crop material into roll bales, and apparatus for wrapping the roll bales with twine, said apparatus comprising:
   a twine dispensing member mounted on said frame for pivoting movement to dispense twine through a gap between two of the conveying members; and
   stationary guide means extending transversely of said frame for guiding the twine into said gap during the pivoting movement of said twine dispensing member.

2. The apparatus of claim 1, wherein said stationary guide means is separate from said twine dispensing member.

3. The apparatus of claim 2, wherein said frame includes a pair of sidewalls and said stationary guide means comprises a bar connected between said sidewalls.

4. The apparatus of claim 1, further comprising drive means connected to said twine dispensing member for effecting the pivoting movement thereof.

5. The apparatus of claim 4, wherein said drive means comprises an electric motor and said twine dispensing member comprises an arm connected to said electric motor by a chain and a sprocket.

6. A roll baling machine comprising:
   a frame including a base frame portion supported by wheels and an auxiliary frame portion pivotally connected to said base frame portion;
   a plurality of conveying members extending transversely of said frame for forming crop material into roll bales; and
   apparatus for wrapping the roll bales with twine including a twine dispensing member mounted on said base frame portion for pivoting movement to dispense twine through a gap between two of the conveying members, and stationary guide means extending transversely of said frame for guiding the twine into said gap during the pivoting movement of said twine dispensing member.

7. The roll baling machine of claim 6, wherein said stationary guide means is located in said base frame portion.

8. A roll baling machine comprising:
   a frame;
   a plurality of conveying rollers extending transversely of said frame for forming crop material into roll bales; and
   apparatus for wrapping the roll bales with twine including a twine dispensing member mounted on said frame for pivoting movement to dispense twine through a gap between two of the conveying rollers, and a stationary guide bar extending transversely of said frame and arranged so that its longitudinal axis is parallel to the longitudinal axes of said rollers for guiding the twine into said gap during the pivoting movement of said twine dispensing member.

9. The roll baling machine of claim 8, wherein said bar is separate from said twine dispensing member.

* * * * *